United States Patent [19]
Fujimoto et al.

[11] 3,800,011
[45] Mar. 26, 1974

[54] AMIDOTHIOL PHOSPHORIC ACID ESTERS

[75] Inventors: Keimei Fujimoto, Kobe; Kunio Mukai, Nishinomiya; Masachika Hirano, Minoo; Katsutoshi Tanaka; Hisami Takeda, both of Takarazuka; Suminori Kawano, Osaka, all of Japan

[73] Assignee: Sumitomo Chemical Company, Osaka, Japan

[22] Filed: Oct. 12, 1970

[21] Appl. No.: 80,224

[30] Foreign Application Priority Data
Oct. 23, 1969 Japan............................... 44-85059

[52] U.S. Cl................ 260/940, 260/948, 260/950, 260/956, 260/957, 260/979, 260/987, 424/210, 424/216, 424/217, 424/219
[51] Int. Cl........................... A01n 9/36, C07f 9/24
[58] Field of Search .......... 260/940, 950, 948, 956, 260/957, 959

[56] References Cited
FOREIGN PATENTS OR APPLICATIONS
1,508,632  1/1968  France................. 260/959

Primary Examiner—Lorraine A. Weinberger
Assistant Examiner—Richard L. Raymond
Attorney, Agent, or Firm—Stevens, Davis, Miller & Mosher

[57]  ABSTRACT

Amidothiol phosphoric acid esters having the formula,

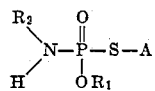

wherein $R_1$ is methyl, ethyl or propyl, $R_2$ is a $C_3$–$C_{10}$ alkenyl, a $C_2$–$C_{10}$ alkylthioalkyl, a $C_2$–$C_{10}$ alkoxyalkyl or a $C_2$–$C_{10}$ cyanoalkyl, and A is a $C_1$–$C_3$ alkyl, a $C_3$–$C_6$ alkenyl, a $C_3$–$C_6$ alkinyl, a halogen-substituted $C_3$–$C_6$ alkenyl or a halogen-substituted $C_3$–$C_6$ alkinyl, which are used as an active ingredient of a pest controlling composition with a systemic action.

13 Claims, No Drawings

AMIDOTHIOL PHOSPHORIC ACID ESTERS

This invention relates to a novel amidothiol phosphoric acid ester, to a process for preparing the same and to a composition containing the same.

More particularly, the invention pertains to a novel amidothiol phosphoric acid ester represented by the formula (I),

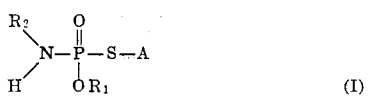

(I)

wherein $R_1$ is methyl, ethyl or propyl group; $R_2$ is an alkenyl group having three to 10 carbon atoms or an alkylthioalkyl, alkoxyalkyl or cyanoalkyl group having two to 10 carbon atoms; and A is an alkyl group having one to three carbon atoms or an alkenyl, alkinyl, halogensubstituted alkenyl or halogen-substituted alkinyl group having three to six carbon atoms, and a process for preparing the same, which comprises dealkylating a thionophosphoric acid amidate represented by the formula (II),

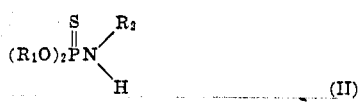

(II)

wherein $R_1$ and $R_2$ are as defined above, with an alkali hydrosulfide represented by the formula (III),

(III)

wherein M is an alkali metal, to form a phosphoric acid salt represented by the formula (IV),

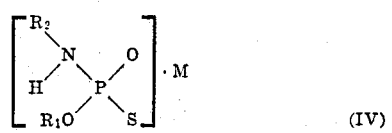

(IV)

wherein $R_1$, $R_2$ and M are as defined above, and condensing said phosphoric acid salt with a halogen compound represented by the formula (V),

(V)

wherein Hal is a halogen atom, and A is as defined above.

The present compounds represented by the formula (I) are particularly suitable for the control of pests in agriculture, forestry and live-stock, and can most effectively control plant-hoppers, mites, aphids, stem borers, rice stem borers, lady beetles, scales and nematodes. Further, the present compounds have effects on such insects as Lepidoptera, Diptera, Coleoptera, Hemiptera and Orthoptera, and on arthropods, molluscs, filamentous fungi and bacteria. What is to be particularly mentioned is that the present compounds characteristically have a so-called systemic action. Systemic chemicals are classified, in general, into those which have such property as to merely permeate into the bodies of platns and animals and those which have such property as to move after permeation, but the present compounds have both of the said properties. Further, common insecticides are used in order to directly kill injurious insects, but the present compounds have such physiological actions that when used at less than lethal concentrations, the compounds disturb the metamorphosis of pests and decrease the number of eggs laid by the pests to disturb the normal propagation thereof. In addition, the present compounds have excellent contact-pesticidal actions and show marked insecticidal and miticidal action against pests which are resistant to conventional chemicals.

Heretofore, there are a few reports on phosphoric acid esters similar to the present compounds. Japanese Patent Publication No. 27,356/68 discloses O-alkyl-S-alkyl-N-phenyl phosphorothioamidates, and "Chemistry and Industry," May 6, 1961, discloses on page 591 O-alkyl-S-alkyl-N-cycloalkyl phosphorothioamidates, but these compounds have low insecticidal activities shown below in the test examples. Japanese Patent Publication No. 14,525/67 discloses O-alkyl-S-methyl phosphorothioamidates, but it is apparent from the test examples shown below that these compounds are extremely high in toxicity to warm-blooded animals. It has been found that the present compounds are not only high in insecticidal activity but also low in toxicity to warm-blooded animals. Accordingly, the present compounds are quite excellent compounds which can be used safely without any injury to mammals. Further, they are excellent compounds which have no phytotoxicity on rice plants and ordinary farm crops, when used at practical application concentrations.

The present compounds of the formula (I) may be prepared according to the following manner:

An alkali hydroxide, e.g. sodium hydroxide or potassium hydroxide, is dissolved in a suitable solvent, e.g. an alcohol such as methanol, ethanol or methyl cellosolve, water, N,N-dimethylformamide or dimethyl sulfoxide. The resulting solution is saturated with hydrogen sulfide to form a solution of an alkali hydrosulfide represented by the formula (III). The thionophosphoric acid amidate represented by the formula (II) is added to the solution of the alkali hydrosulfide and the resulting mixture is heated while being stirred to complete dealkylation. Subsequently, the phosphoric acid salt in the form of a wet crystal or a viscous liquid is isolated and then condensed with the halogen compound represented by the formula (V) in the presence or absence of a suitable solvent, e.g. an alcohol such as methanol or ethanol, a ketone such as methyl ethyl ketone or acetone, or water, whereby a phosphoroamidothiolate represented by the formula (I) can be obtained easily in a high yield.

The reaction temperature in the dealkylation varies depending on the kinds of the starting materials and the solvent, and is ordinarily the reflux temperature of the solvent used, and the reaction time is in the range of several hours to 10 and several hours. The reaction temperature and time in the condensation reaction with the halogen compound are 30° to 80°C and 2 to 5 hours, whereby a desired compound can be obtained in a high yield.

Several examples of the starting materials used in the present invention, i.e. the phosphorothionoamidate, the alkali hydrosulfide and the halogen compound, are shown below, but it is needless to say that compounds usable in the present invention are not limited only to these.

Examples of the phosphorothionoamidate are
O,O-dimethyl-N-allyl phosphorothionoamidate,
O,O-diethyl-N-allyl phosphorothionoamidate,
O,O-di-n-propyl-N-allyl phosphorothionoamidate,
O,O-dimethyl-N-2-methylthioethyl phosphorothionoamidate,
O,O-dimethyl-N-2-ethylthioethyl phosphorothionoamidate,
O,O-dimethyl-N-3-methoxypropyl phosphorothionoamidate,
O,O-dimethyl-N-3-ethoxypropyl phosphorothionoamidate,
O,O-dimethyl-N-cyanoethyl phosphorothionoamidate,
O,O-dimethyl-N-cyanomethyl phosphorothionoamidate,
O,O-diethyl-N-2-methylthioethyl phosphorothionoamidate and
O,O-diethyl-N-3-methoxypropyl phosphorothionoamidate.

Examples of the alkali hydrosulfide are sodium hydrosulfide and potassium hydrosulfide.

Examples of the halogen compound are 3-chloro-1-propene, 3-bromo-1-propene, 1,3-dichloropropene, 1-chloro-2-butene, 1,3-dichloro-2-butene, 2,3-dichloropropene, 2,3-dibromopropene, 3-chloro-1-butene, 1,4-dichloro-2-butene, γ-chloro-(iso)-butene, propargyl bromide, (n)-propyl bromide, (iso)-propyl bromide, ethyl bromide, methyl bromide, methyl iodide and ethyl iodide.

In the next place, examples of typical organophosphoric acid esters belonging to the present invention are shown below.

| Compound number | Structural formula |
|---|---|
| (1) | $CH_2=CH \cdot CH_2NH-\overset{O}{\underset{OCH_3}{\overset{\|}{P}}}-S-CH_3$ |
| (2) | $CH_2=CH \cdot CH_2NH-\overset{O}{\underset{OCH_3}{\overset{\|}{P}}}-S-C_2H_5$ |
| (3) | $CH_2=CH \cdot CH_2NH-\overset{O}{\underset{OCH_3}{\overset{\|}{P}}}-S-C_3H_7(n)$ |
| (4) | $CH_2=CH \cdot CH_2NH-\overset{O}{\underset{OCH_3}{\overset{\|}{P}}}-S-CH_2C\equiv CH$ |
| (5) | $CH_2=CH \cdot CH_2NH-\overset{O}{\underset{OCH_3}{\overset{\|}{P}}}-S-CH_2CH=CH_2$ |
| (6) | $CH_2=CH \cdot CH_2NH-\overset{O}{\underset{OCH_3}{\overset{\|}{P}}}-S-CH_2C(CH_3)=CH_2$ |
| (7) | $CH_2=CH \cdot CH_2NH-\overset{O}{\underset{OCH_3}{\overset{\|}{P}}}-S-CH_2CH=CHCl$ |
| (8) | $CH_2=CH \cdot CH_2NH-\overset{O}{\underset{OCH_3}{\overset{\|}{P}}}-S-CH_2CH=CH \cdot Cl$ |
| (9) | $CH_2=CH \cdot CH_2NH-\overset{O}{\underset{OC_2H_5}{\overset{\|}{P}}}-S-CH_3$ |
| (10) | $CH_2=CH \cdot CH_2NH-\overset{O}{\underset{OC_2H_5}{\overset{\|}{P}}}-S-C_2H_5$ |
| (11) | $CH_2=CH \cdot CH_2NH-\overset{O}{\underset{OC_2H_5}{\overset{\|}{P}}}-S-C_3H_7(n)$ |
| (12) | $CH_2=CH \cdot CH_2NH-\overset{O}{\underset{OC_2H_5}{\overset{\|}{P}}}-S-CH_2C\equiv CH$ |
| (13) | $CH_2=CH \cdot CH_2NH-\overset{O}{\underset{OC_2H_5}{\overset{\|}{P}}}-S-CH_2CH=CH_2$ |
| (14) | $CH_2=CH \cdot CH_2NH-\overset{O}{\underset{OCH_3}{\overset{\|}{P}}}-S-CH_2CH=CHCH_3$ |
| (15) | $C_2H_5SCH_2CH_2NH-\overset{O}{\underset{OCH_3}{\overset{\|}{P}}}-S-CH_2C\equiv CH$ |
| (16) | $CH_3OCH_2CH_2CH_2NH-\overset{O}{\underset{OCH_3}{\overset{\|}{P}}}-S-CH_2C\equiv CH$ |
| (17) | $NC-CH_2CH_2NH-\overset{O}{\underset{OCH_3}{\overset{\|}{P}}}-S-CH_2C\equiv CH$ |
| (18) | $CH_3SCH_2CH_2NH-\overset{O}{\underset{OCH_3}{\overset{\|}{P}}}-S-CH_2C\equiv CH$ |
| (19) | $CH_3SCH_2CH_2NH-\overset{O}{\underset{OCH_3}{\overset{\|}{P}}}-S-CH_2CH=CH_2$ |
| (20) | $CH_3SCH_2CH_2NH-\overset{O}{\underset{OCH_3}{\overset{\|}{P}}}-S-C_2H_5$ |
| (21) | $C_2H_5SCH_2CH_2NH-\overset{O}{\underset{OC_2H_5}{\overset{\|}{P}}}-S-CH_2C\equiv CH$ |
| (22) | $CH_3OCH_2CH_2CH_2NH-\overset{O}{\underset{OCH_3}{\overset{\|}{P}}}-S-CH_3$ |
| (23) | $CH_3SCH_2CH_2NH-\overset{O}{\underset{OCH_3}{\overset{\|}{P}}}-S-CH_2CH=CHCl$ |
| (24) | $C_2H_5SCH_2CH_2NH-\overset{O}{\underset{OC_2H_5}{\overset{\|}{P}}}-S-CH_2C=CH_2$ |

In actual application, the present compounds may be used as it is without incorporation of carriers. Alternatively, they may be used in admixture with inert carriers for easier application as pesticides and can be formulated, according to procedures thoroughly known to those skilled in the art, without any particular conditions like in the case of ordinary organo-phosphorus preparations, into any of such ordinarily adopted forms as emulsifiable concentrates, wettable powders, oil sprays, dusts, aerosols, fumigants and granules for soil application and seed-coating. Thus, the present compounds can be used in any required forms. Further, the present compounds may be used in admixture with one or more of other chemicals and fertilizers to make the effects thereof broader and higher. For example, the compounds are mixed with organo-phosphorus type insecticides such as Sumithion (registered trade name for an insecticide produced by Sumitomo Chemical Co.; the same shall apply hereinafter) and Dimethoate, pyrethroid type insecticides such as allethrin and phthalthrin, organo-chlorine type insecticides such as BHC and DDT, carbamate type insecticides such as 3,-4-dimethylphenyl-N-methylcarbamate, 2-sec-butylphenyl-N-methylcarbamate, 3-methylphenyl-N-methylcarbamate and 1-naphthyl-N-methylcarbamate, synergists, repellants, attractants and the like, whereby multi-purpose compositions can be prepared and, depending on the combinations, synergistic effects can also be expected.

In order to clarify the prominent characteristics and effects of the present compounds, typical test results are shown in the test examples set forth below.

In the test examples, the present compounds are represented by the aforesaid exemplification numbers.

Test Example 1
Lethal effects (contact poison):
Mottled kidney bean plants at the two-leaves stage, which had elapsed 20 days after sowing, were parasitized with a larger number of adults of twospotted red spiders (*Tetranychus telarius*). The kidney bean leaves parasitized with said spiders were immersed for 1 minute in a solution formed by diluting with water each of the present compounds in the form of wettable powders. Subsequently, water was supplied so as not to wither the leaves. After 48 hours, the alive and dead of the spiders were observed by means of a magnifying glass and, from the mortality, the value of $LC_{50}$ was calculated according to the Finney's simplified iconography. The results obtained were as shown in Table 1.

TABLE 1

| Compound number | $LC_{50}$ (dilution times of active ingredient) |
|---|---|
| (4) | 2,000,000 |
| (5) | 800,000 |
| (6) | 200,000 |
| (7) | 660,000 |
| (8) | 600,000 |
| (9) | 800,000 |
| (10) | 450,000 |
| (12) | 1,300,000 |
| 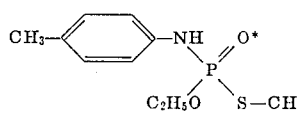 | Ineffective |
| (Compound disclosed in Japanese patent publication No. 27,356/68) | |
| O,O-dimethyl-S-(N-methylcarbamolyl)-methyl phosphorodithioate* | 500,000 |

*Control.

Test Example 2
Lethal effects (insecticidal effects on smaller brown planthoppers, Laodelphax striatellus Fallen):

Rice seedlings (15 – 20 cm in height), which has elapsed 15 days after germination, were immersed for 1 minute in an emulsion prepared by diluting to a given concentration each of the present compounds in the form of emulsifiable concentrates which had been formulated according to Example 1. After air-drying, the seedlings were placed in a large test tube. Into the test tube were liberated 20 to 30 smaller brown planthoppers, and the test tube was covered with a wire net. After 24 hours, the mortality of the planthoppers were measured and, from the mortality, the value of $LC_{50}$ was calculated according to the Finney's iconography. The results obtained were as shown in Table 2.

Table 2

| Compound No. | $LC_{50}$ (dilution times of active ingredient) |
|---|---|
| (2) | 30,000 |
| (4) | 100,000 |
| (5) | 32,000 |
| (8) | 32,000 |
| (9) | 45,000 |
| (12) | 30,000 |
| (13) | 25,000 |
| (14) | 60,000 |

Test Example 3
Residual insecticidal effects:
Mottled kidney bean plants grown in a flower pot which had elapsed 20 days after sowing were dusted, using a bell jar duster, with 3 kg/10 ares of each of the present compounds in the form of 3 percent dusts. After the dusting, the plants were parasitized at intervals of several days with spider mite adults, and the mortality of the mites after 48 hours from the dusting was investigated. The results obtained were as shown in Table 3.

Table 3

| Compound No. | Mortality (%) | | | |
|---|---|---|---|---|
| | After 3 days | After 5 days | After 9 days | After 13 days |
| (4) | 79.4% | 92.4% | 100 % | 100 % |
| (5) | 21.4 | 92.8 | 73.4 | 61.2 |
| (8) | 84.5 | 100.0 | 100.0 | 72.6 |
| (11) | 100.0 | 63.4 | 60.0 | 21.4 |
| (12) | 92.4 | 100.0 | 99.3 | 76.5 |
| (14) | 89.1 | 93.2 | 100.0 | 98.8 |
| O,O-Dimethyl-S-(N-methylcarbamoyl)-methyl phosphoro-dithioate* | 100.0 | 97.1 | 96.3 | 32.4 |

* Control

Text Example 4
Systemic effects:
Mottled kidney bean plants were grown to the two-leaves stage in a flower pot of 9 cm in diameter. To the root portion of the plants were applied in a proportion of 4 kg per 10 acres each of the present compounds in the form of 3 percent granules. After 4 days, the mottled bean leaves were parasitized with a large number of adults of two-spotted red spiders. Six days thereafter, the leaves were cut, and the alive and dead of the spiders were observed to calculate the mortality thereof. The results obtained were as shown in Table 4.

Table 4

| Compound No. | Number of test insects | Mortality (%) |
| --- | --- | --- |
| (-) | 291 | 93.4 |
| (2) | 388 | 99.4 |
| (4) | 121 | 100.0 |
| (6) | 211 | 83.4 |
| (10) | 561 | 73.8 |
| (12) | 620 | 92.7 |
| (14) | 315 | 100.0 |
| O,O-Dimethyl-S-(N-methyl-carbamoyl)-methyl phosphorodithioate* | 631 | 90.8 |

* Control

Test Example 5

Mice oral acute toxicity:

Male mice having an average body weight of about 20 g was orally administrated with an emulsion formed by diluting with water each of the present compounds in the form of emulsifiable concentrates. After 48 hours, the alive and dead of the mice were observed and, from the mortality, the value of $LD_{50}$ was calculated according to the Richfield method. The results obtained were as shown in Table 5.

TABLE 5

| Compound number | $LD_{50}$ (mg./kg.) |
| --- | --- |
| (1) | 200 |
| (2) | 300 |
| (4) | 60 |
| (5) | 100 |
| (6) | 120 |
| (10) | 93 |
| O,O-diethyl-O-(4-nitrophenyl)phosphorothioate* | 6 |
| 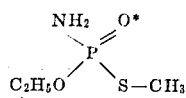 | 3 |

(Compound disclosed in Japanese patent publication No. 14,525/67)

*Control.

Test Example 6

Rice plants at the offshoot stage which had elapsed 30 days after planting were grown in a 1/50,000 Wagner pot and parasited with 50 rice stem borer larvae immediately after hatching. Each of the present compounds in the form of 50 percent emulsifiable concentrates was diluted with water to 200 times, and 6 cc per pot of the resulting emulsion was sprayed to the rice plants. After 3 days, the leaves of the rice plants were broken, and the alive and dead of the larvae were observed to calculate the mortality thereof. The results obtained were as shown in Table 6.

Table 6

| Compound No. | Mortality (%) |
| --- | --- |
| (4) | 100 |
| (6) | 100 |
| (12) | 83.4 |
| (13) | 100 |
| Sumithion * | 77.4 |

* Control

Test Example 7

To each root portion of 5 years old apple trees grown in an orchard, which was being attacked by leaf rollers and aphids, 100 g per tree of each of the present compounds in the form of 5 percent granules was sprayed to in the form of a circle of 1 cm in radius. After 5 days, the number of survival insects was counted to obtain the results as set forth in Table 7.

Table 7

| Compound No. | Number of survival insects after 5 days (per 500 leaves) | |
| --- | --- | --- |
| | Moths | Aphids |
| (1) | 0 | 0 |
| (4) | 0 | 0 |
| (8) | 12.4 | 0 |
| (12) | 3.4 | 6.1 |
| O,O-Dimethyl-S-(N-methyl-carbamoyl)-methyl phosphorodithioate * | 8.2 | 12.3 |
| Non-treatment | 635 | 831 |

* Control

Test Example 8

"Mandarin" orange fruits, which had been parasitized with a large number of Yaneno scales (Unaspis yanenoensis Kuwana), were immersed for 1 minute in a solution formed by diluting with water each of the present compounds in the form of 50 percent wettable powders. After 2 weeks, the alive and dead of the scales were observed to calculate the mortality thereof. The results obtained were as shown in Table 8.

Table 8

| Compound No. | Mortality (%) |
| --- | --- |
| (4) | 100 |
| (5) | 81.2 |
| (7) | 73.4 |
| (8) | 92.8 |
| (12) | 100 |
| O,O-Dimethyl-S-(N-methyl-*carbamoyl)-methyl phosphorodithioate | 63.4 |

* Control

Test Example 9

Preventive effects on rice blast:

Rice plants (variety "Waseasahi"), which had been cultivated to the three-leaves stage in a flower pot of 9 cm in diameter, were sprayed with 7 ml per pot of each of test chemicals diluted to a given concentration. After 4 hours, the plants were further sprayed and inoculated with a spore suspension of rice blast fungus. Three days thereafter, the number of spots generated was counted to investigate the fungicidal effect of each chemical. The results obtained were as shown in Table 9.

$$\text{Preventive value (percent)} = \frac{\text{Number of spots in non-treated area} - \text{Number of spots in treated area}}{\text{Number of spots in non-treated area}} \times 100$$

Table 9

| Compound No. | Active ingredient (p.p.m.) | Preventive value (%) |
| --- | --- | --- |
| (6) | 500 | 85.4 |
| (7) | do. | 96.3 |
| (8) | do. | 92.8 |
| (12) | do. | 89.3 |
| EBP* | do. | 93.4 |
| Non-treatment | do. | 0 |

* Control

Test Example 10

A field of Chinese cabbages, which had elapsed 40 days after sowing, was sectioned to areas of 100 m², and each of the present compounds (1), (4), (5), (8), (10) and (14) in the form of 3 percent granules was sprinkled over the field in a proportion of 3 kg per 10 ares. Over a period of 1 month, 300 eggs per 3.3 m² of Prodenia litura Fabricius were attached onto the leaves of said cabbages every 5 days. As the result, no emergence of Prodenia litura Fabricius was observed at all during 2 months before harvest.

Test Example 11

Mottled kidney bean plants at the two-leaves stage which had elapsed 10 days after sowing were parasitized with a large number of adults of two-spotted red spiders (Tetranychus telarius). The kidney bean leaves parasitized with the said red spiders were immersed for 1 minute in a solution formed by diluting with water each of the present compound in the form of wettable powders, and then water was supplied so as not to wither the leaves. After 48 hours, the alive and dead of the red spiders were observed by use of a binocular microscope and, from the mortality, the value of $LC_{50}$ was calculated according to the Finney's simplified iconography. The results obtained were as shown in Table 10.

TABLE 10

| Compound number | $LC_{50}$ (p.p.m.) |
| --- | --- |
| (15) | 19 |
| (16) | 21 |
| (17) | 26 |
| (18) | 22 |
| (19) | 15 |

$$CH_3-\langle\phantom{x}\rangle-NH\phantom{xx}O^*$$
$$\phantom{xxxxxxxxx}\diagdown\phantom{x}\diagup$$
$$\phantom{xxxxxxxxxxx}P$$
$$\phantom{xxxxxxxxx}\diagup\phantom{x}\diagdown$$
$$\phantom{xxxxx}C_2H_5O\phantom{xxxx}SCH_3$$

Ineffective.

(Compound disclosed in Japanese patent publication No. 27,356/68)

* Control.

Test Example 12

Lethal effects (insecticidal effects on smaller brown planthoppers):

Rice seedlings (15 – 20 cm in height), which had elapsed 15 days after sowing, were immersed for 1 minute in an emulsion prepared by diluting to a given concentration each of the present compounds in the form of emulsifiable concentrates. After air-drying, the seedlings were placed in a large test tube. Into the test tube were liberated 20 to 30 smaller brown planthopper adults, and the test tube was covered with a wire net. After 24 hours, the mortality of the planthoppers was measured and, from the mortality, the value of $LC_{50}$ was calculated according to the Finney's iconography. The results obtained were as shown in Table 11.

Table 11

| Compound No. | $LC_{50}$ (p.p.m.) |
| --- | --- |
| (15) | 28 |
| (16) | 23 |
| (17) | 47 |
| (18) | 31 |
| (19) | 4 |
| (21) | 45 |

Test Example 13

Residual insecticidal effects:

Mottled kidney bean plants grown in a flower pot which had elapsed 10 days after sowing were dusted, using a bell jar duster, with 3 kg/10 ares of each of the present compounds in the form of 3 percent dusts. After the dusting, the plants were parasitized at intervals of several days with spider mite adults, and the mortality of the mites after 48 hours from the dusting was investigated. The results obtained were as shown in Table 12.

TABLE 12

| Compound number | Mortality (percent) after— | | | |
| --- | --- | --- | --- | --- |
| | 2 days | 5 days | 8 days | 12 days |
| (15) | 100 | 100 | 90.0 | 100 |
| (16) | 100 | 75.0 | 47.1 | 60.0 |
| (17) | 100 | 100 | 93.8 | 84.6 |
| (18) | 98.0 | 100 | 95.3 | 100 |
| (19) | 100 | 100 | 96.7 | 73.2 |
| O,O-dimethyl-S-(N-methyl carbamoyl)-methyl phosphorodithioate* | 100 | 97.1 | 96.3 | 32.4 |
| $NH_2\phantom{x}O$ $\phantom{xx}\diagdown P\diagup$ $CH_3O\phantom{x}S-CH_2C\equiv CH$ | 3.1 | 7.8 | 2.0 | |

(Compound disclosed in Japanese patent publication No. 7,357/68)

*Control.

Test Example 14

Systemic effects:

Mottled kidney bean plants were grown to the two-leaves stage in a flower pot of 9 cm in diameter. To the root portion of the plants was applied in a proportion of 4 kg per 10 area each of the present compounds in the form of 3 percent granules, and the plants were parasitized at intervals of several days with two-spotted red spider adults. After 48 hours, the leaves of the plants were cut and taken up, and the alive and dead of the red spiders were observed by use of a binocular microscope. The results obtained were as shown in Table 13.

TABLE 13

| Compound number | Mortality (percent) after — | | | |
| --- | --- | --- | --- | --- |
| | 2 days | 5 days | 8 days | 12 days |
| (15) | 13.6 | 83.3 | 100 | 100 |
| (16) | 5.0 | 86.0 | 88.5 | 73.3 |
| (17) | 22.7 | 84.5 | 90.0 | 54.5 |
| (18) | 18.5 | 91. | 88.7 | 64.2 |
| (19) | 20.0 | 83.5 | 100 | 89.7 |
| $NH_2\phantom{x}O$ $\phantom{xx}\diagdown P\diagup$ $CH_3O\phantom{x}S-CH_2C\equiv CH$ | 16.2 | 14.4 | 0 | 1.5 |

(compound disclosed in Japanese patent publication No. 7,357/68)

*Control.

Test Example 15

Insecticidal effects on green peach aphids (*Myzus persicae* Sulzer):

Potted Chinese cabbages which had elapsed 1 month after sowing were parasitized with a large number of green peach aphids. To the root portion of the cabbages, each of the present compounds in the form of 5 percent granules was sprinkled in a proportion of 6 kg/10 ares. After 3 days, the alive and dead of the green peach aphids were observed to calculate the mortality thereof. The results obtained were as shown in Table 14.

Table 14

| Compound No. | Mortality (%) |
|---|---|
| (15) | 97.1 |
| (16) | 83.5 |
| (18) | 100.0 |
| (19) | 75.0 |
| O,O-Dimethyl-S-(N-methylcarbamoyl-*methyl)-phosphorodithioate | 85.3 |

* Control

Test Example 16

Tomato seedlings which had elapsed 1 month after sowing were sprayed with an emulsion prepared by diluting with water to 1,000 times each of the present compounds in the form of 5 percent emulsifiable concentrates. The tomato seedlings were cut and then placed in a glass Petri dish together with 28-spotted lady beetles (*Epilachna vigintioctopunctata*). After 48 hours, the alive and dead of the beetles were observed to calculate the mortality thereof. The results obtained were as shown in Table 15.

Table 15

| Compound No. | Mortality (%) |
|---|---|
| (15) | 100.0 |
| (16) | 95.0 |
| (18) | 73.5 |
| (21) | 65.3 |
| Sumithion* | 88.1 |

* Control

Test Example 17

18 – 23 Rice seedlings were grown to the 3-to 4-leaves stage in a flower pot of 9 cm in diameter and sprayed with an emulsion formed by diluting with water to 1,000 times each of the present compounds in the form of 50 percent emulsifiable concentrates. After air-drying, the rice seedlings were covered with a wire net, and smaller brown planthopper adults were liberated into the wire net. After 24 hours, the alive and dead of the planthoppers were observed to calculate the mortality thereof. Further, smaller brown planthopper adults were freshly liberated in the wire net at intervals of several days to examine the residual effect of each of the present compounds. The results obtained were as shown in Table 16.

Table 16

| Compound No. | Mortality (%) | | | |
|---|---|---|---|---|
| | After 1 day | After 4 days | After 7 days | After 11 days |
| (15) | 93.3 | 92.0 | 86.6 | 26.7 |
| (16) | 100.0 | 86.6 | 74.0 | 29.6 |
| (18) | 100.0 | 90.0 | 13.3 | 10.0 |
| (19) | 96.2 | 92.6 | 71.4 | 29.6 |
| 3,4-Dimethylphenyl-* N-Methylcarbamate | 93.1 | 70.0 | 10.0 | 6.4 |

* Control

Test Example 18

Mice oral acute toxicity:

Male mice having an average body weight of about 20 g were orally administrated with an emulsion formed by diluting with water each of the present compounds in the form of emulsifiable concentrates. After 48 hours, the alive and dead of the mice were observed to calculate the value of $LD_{50}$ according to The Richfield method. The results obtained were as shown in Table 17.

TABLE 17

| Compound number | $LD_{50}$ (mg./kg.) |
|---|---|
| (15) | 100 |
| (16) | 50 |
| (17) | 120 |
| (18) | 50 |
| (19) | 600 |
| (20) | 1,000 |
| O,O-diethyl-O-(4-nitrophenyl)-phosphorothioate* | 6 |//

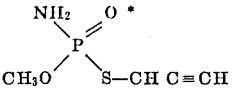

(Compound disclosed in Japanese patent publication No. 7,357/68)

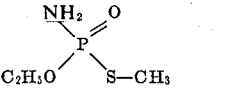

(Compound disclosed in Japanese patent publication No. 525/67)

Test Example 19

Preventive effects on rice blast Rice plants (variety "Waseasahi"), which had been cultivated to the three-leaves stage in a flower pot of 9 cm in diameter, were sprayed with 7 ml per pot of an emulsion formed by diluting to a given concentration each of the present compounds in the form of emulsifiable concentrates. After 4 hours, the plants were inoculated with a spore suspension of rice blast fungus. Three days thereafter, the number of spots generated was counted to investigate the fungicidal effect of each compound. The results obtained were as shown in Table 18. All the present compounds displayed quite excellent effects as compared with the known analogous compound.

The preventive value was calculated according to the same equation as in Test Example 9.

TABLE 18

| Compound number | Active ingredient (p.p.m.) | Preventive value (percent) |
|---|---|---|
| (16) | 1,000 | 92.6 |
| (17) | 1,000 | 88.8 |
| (22) | 1,000 | 90.4 |
| 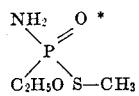 * | 1,000 | 11.2 |
| (Compound disclosed in Japanese patent publication No. 14,525/67) | | |
| Non-treatment | | 0.0 |

*Control

The present invention illustrated in further detail below with reference to examples, but it is needless to say that the invention is variable within a wide scope without being limited only to these examples.

Example 1

Preparation of emulsifiable concentrate:

According to the table shown below, each compound was thoroughly mixed with the solvent and the emulsifier in this order to obtain a homogeneous emulsifiable concentrate. In application, the emulsifiable concentrate was diluted with water and the resulting emulsion was sprayed.

| Active ingredient | (%) | Solvent | (%) | Emulsifier | (%) |
|---|---|---|---|---|---|
| Compound (1) | 50 | Xylene | 30 | Sorpol 2020 | 20 |
| Compound (5) | 20 | Cyclohexanone | 50 | Sorpol 2492 | 30 |

Example 2

Preparation of wettable powder:

40 Parts of the compound (9) was thoroughly mixed with 5 parts of Sorpol 5029 (registered trade name for an emulsifier produced by Toho Chemical Co.). The resulting mixture was dropped in 55 parts of 200 mesh talc, while sufficiently stirring the talc in a mortar, to obtain a wettable powder. In application, the wettable powder was diluted with water and the resulting solution was sprayed.

Example 3

Preparation of granule:

According to the table shown below, each compound was thoroughly mixed with the binder and the extender in this order. After kneading with a small amount of water, the resulting mixture was granulated by means of a granulator and then dried to obtain a granule. In application, the granule was sprinkled as it was.

| Active ingredient | (%) | Binder | (%) | Extender | (%) |
|---|---|---|---|---|---|
| Compound (4) | 2 | Sodium lignin sulfonate | 1 | Clay | 97 |
| Compound (12) | 5 | do. | 2 | do. | 93 |

Example 4

Preparation of dust:

According to the table shown below, each compound was dissolved in a small amount of acetone and thoroughly mixed with 200 mesh talc, and then the acetone was removed by vaporization to obtain a dust. The dust was dusted as it was.

| Active ingredient | (%) | Extender | (%) |
|---|---|---|---|
| Compound (7) | 2 | Talc | 98 |
| Do. | 4 | do. | 96 |

Example 5

Preparation of emulsifiable concentrate:

According to the table shown below, each compound was thoroughly mixed with the solvent and the emulsifier in this order to obtain a homogeneous emulsifiable concentrate. In application, the emulsufiable concentrate was diluted with water and the resulting emulsion was sprayed.

| Active ingredient | (%) | Solvent | (%) | Emulsifier | (%) |
|---|---|---|---|---|---|
| Compound (15) | 50 | Xylene | 30 | Sorpol 2020 | 20 |
| Compound (19) | 20 | Cyclohexanone | 50 | Sorpol 2492 | 30 |

Example 6

Preparation of wettable powder:

40 Parts of the compound (23) was thoroughly mixed with 5 parts of Sorpol 5029. The resulting mixture was dropped in 55 parts of 200 mesh talc, while sufficiently stirring the talc in a mortar, to obtain a wettable powder. In application, the wettable powder was diluted with water and the resulting solution was sprayed.

Example 7

Preparation of granule:

According to the table shown below, each compound was thoroughly mixed with the binder and the extender in this order. After kneading with a small amount of water, the resulting mixture was granulated by means of a granulator and then dried to obtain a granule. In application, the granule was sprinkled as it was.

| Active ingredient | (%) | Binder | (%) | Extender | (%) |
|---|---|---|---|---|---|
| Compound (18) | 2 | Sodium lignin sulfonate | 1 | Clay | 97 |
| Compound (21) | 5 | do. | 2 | do. | 93 |

Example 8

Preparation of dust:

According to the table shown below, each compound was dissolved in a small amount of acetone and thoroughly mixed with 200 mesh talc, and then the acetone was removed by vaporization to obtain a dust. In application, the dust was dusted as it was.

| Active ingredient | (%) | Extender | (%) |
|---|---|---|---|
| Compound (21) | 2 | Talc | 98 |
| Compound (24) | 4 | do. | 96 |

Example 9

Synthesis of compound (1):

11.2 g of potassium hydroxide was dissolved in 100 ml of methyl cellosolve, and the resulting solution was saturated under cooling with hydrogen sulfide to prepare a methyl cellosolve solution of potassium hydro sulfide. To this solution was added at room temperature 36.2 g of O,O-dimethyl-N-allyl phosphorothionoamidate, and the resulting mixture was stirred at 95° to 100°C for 5 hours.

Subsequently, the solvent was removed under reduced pressure, the residue was mixed with acetone and freed from insolubles, and then the acetone was removed under reduced pressure. Thereafter, the residue was dissolved in water and then washed with toluene. From the aqueous layer, water was removed under reduced pressure to obtain 40.2 g of potassium o-methyl-N-allyl phosphorothioamidate in the form of a pale yellow viscous liquid.

10.3 g of this salt was dissolved in 50 ml of methyl alcohol, and the resulting solution was charged with 7.5 g of methyl iodide and stirred at 50° to 55° C for 1 hour. Subsequently, the solvent was removed under reduced pressure, the residue was charged with water and chloroform, and the chloroform layer was drid with anhydrous sodium sulfate. Thereafter, the chloroform was removed under reduced pressure to obtain 8.7 g of O,S-diemthyl-N-allyl phosphorothioamidate in the form of a pale yellow oil, $n_D^{25}$ 1.5032.

Elementary analysis:

|   | Calculated (%) (for $C_5H_{12}NO_2PS$) | Found (%) |
|---|---|---|
| P | 17.10 | 17.07 |
| S | 17.70 | 17.83 |
| N | 7.73 | 7.51 |

Example 10

Synthesis of compound (4):

A mixture comprising 10.3 g of potassium O-methyl-N-allyl phosphorothioamidate and 6.5 g of propargyl bromide was stirred and refluxed for 2 hours in 50 ml of methyl alcohol. The reaction liquid was treated in the same manner as in Example 9 to obtain 9.8 g of O-methyl-S-propargyl-N-allyl phosphorothioamidate in the form of a reddish brown oil, $n_D^{25}$ 1.5140.

Elementary analysis:

|   | Calculated (%) (for $C_7H_{12}NO_2PS$) | Found (%) |
|---|---|---|
| P | 15.09 | 14.69 |
| S | 15.59 | 15.26 |
| N | 6.83 | 6.52 |

Example 11

Synthesis of compound (9):

To a methyl cellosolve solution of potassium hydrosulfide prepared from 100 ml of methyl cellosolve, 12.2 g of potassium hydroxide and hydrogen sulfide was added 41.8 g of O,O-diethyl-N-allyl phosphorothionoamidate, and the resulting mixture was stirred at 95° to 100°C for 7 hours. The mixture was treated in the same manner as in Example 9 to obtain 39.5 g of potassium O-ethyl-N-allyl phosphorothioamidate in the form of a wettable white crystal.

10.9 g of the thus obtained thiophosphoric acid salt and 7.5 g of methyl iodide were stirred at 45° to 50°C for 1 hour of 50 ml of ethyl alcohol. Subsequently, the reaction liquid was treated in the same manner as in Example 9 to obtain 8.6 g of O-ethyl-S-methyl-N-allyl phosphorothioamidate in the form of a pale yellow oil, $n_D^{31.5}$ 1.4950.

Elementary analysis:

|   | Calculated (%) (for $C_6H_{14}NO_2PS$) | Found (%) |
|---|---|---|
| P | 15.86 | 15.44 |
| S | 16.39 | 16.41 |
| N | 7.18 | 7.03 |

Example 12

Synthesis of compound (5):

To a methyl cellosolve solution of sodium hydrosulfide prepared from 50 ml of methyl cellosolve, 4.0 g of sodium hydroxide and hydrogen sulfide was added 18.1 g of O,O-dimethyl-N-allyl phosphorothionoamidate, and the resulting mixture was stirred at 95° to 100°C for 5 hours. After cooling to room temperature, the mixture was charged with 13.2 g of allyl bromide and then stirred at 55° to 60°C for 2 hours. Subsequently, the reaction liquid was treated in the same manner as in Example 9 to obtain 17.5 g of O-methyl-S-allyl-N-allyl phosphorothioamidate in the form of a pale yellow oil, $n_D^{30.5}$ 1.5039.

Elementary analysis:

|   | Calculated (%) (for $C_7H_{14}NO_2PS$) | Found (%) |
|---|---|---|
| P | 14.94 | 14.79 |
| S | 15.47 | 15.30 |
| N | 6.76 | 6.59 |

EXAMPLE 13

Synthesis of compound (2):

A mixture comprising 10.3 g of potassium O-methyl-N-allyl phosphorothioamide and 6.0 g of ethyl bromide was stirred under reflux for 3 hours in 50 ml of acetone. Subsequently, the mixture was treated in the same manner as in Example 9 to obtain 8.3 g of O-methyl-S-ethyl-N-allyl-phosphorothioamidate, in the form of a pale yellow oil, $n_D^{27}$ 1.4930.

Elementary analysis:

|   | Calculated (%) (for $C_6H_{14}NO_2PS$) | Found (%) |
|---|---|---|
| P | 15.86 | 15.82 |
| S | 16.42 | 16.71 |
| N | 7.18 | 6.78 |

EXAMPLE 14

Synthesis of compound (3):

A mixture comprising 19.0 g of sodium O-methyl-N-allyl phosphorothioamide and 6.8 g of (n)-propyl bromide was stirred under reflux for 3 hours in 50 ml of methyl alcohol. The mixture was treated in the same manner as in Example 9 to obtain 7.6 g of O-methyl-S-(n)-propyl-N-allyl phosphorothioamidate in the form of a pale yellow oil, $n_D^{31.5}$ 1.4853.

Elementary analysis:

|   | Calculated (%) (for $C_7H_{16}NO_2PS$) | Found (%) |
|---|---|---|
| P | 14.80 | 14.79 |
| S | 15.32 | 15.47 |
| N | 6.69 | 6.37 |

EXAMPLE 15

Synthesis of compound (6):

A mixture comprising 10.3 g of potassium O-methyl-N-allyl phosphorothioamide and 5.0 g of methallyl chloride was stirred under reflux for 2 hours in 50 ml of methyl alcohol. The mixture was treated in the same manner as in Example 9 to obtain 9.1 g of O-methyl-S-methallyl-N-allyl phosphorothioamidate in the form of a yellow oil, $n_D^{31.0}$ 1.5018.

Elementary analysis:

|   | Calculated (%) (for $C_8H_{16}NO_2PS$) | Found (%) |
|---|---|---|
| P | 14.80 | 14.79 |
| S | 15.32 | 15.51 |
| N | 6.69 | 6.37 |

EXAMPLE 16

Synthesis of compound (7):

A mixture comprising 10.3 g of potassium O-methyl-N-allyl phosphorothioamidate and 6.6 g of 1,3-dichloro-2-butene was stirred under reflux for 2 hours in 50 ml of methyl alcohol. The mixture was treated in the same manner as in Example 9 to obtain 11.1 g of O-methyl-S-(3-chloro-2-butenyl)-N-allyl phosphorothioamidate in the form of a pale yellowish green oil, $n_D^{32.5}$ 1.5174.

Elementary analysis:

|   | Calculated (%) (for $C_8H_{15}ClNO_2PS$) | Found (%) |
|---|---|---|
| P | 12.11 | 12.08 |
| S | 12.54 | 12.67 |
| N | 5.48 | 5.36 |
| Cl | 13.86 | 13.57 |

EXAMPLE 17

Synthesis of compound (8):

A mixture comprising 10.3 g of potassium O-methyl-N-allyl phosphorothioamidate and 5.8 g of 1,3-dichloropropene was stirred under reflux for 2 hours in 50 ml of methyl alcohol. Thi mixture was treated in the same manner as in Example 9 to obtain 9.1 g of O-methyl-S-(3-chloro-2-propenyl)-N-allyl phosphorothioamidate in the form of a pale yellow oil, $n_D^{33.0}$ 1.5199.

Elementary analysis:

|   | Calculated (%) (for $C_7H_{13}ClNO_2PS$) | Found (%) |
|---|---|---|
| P | 12.76 | 12.77 |
| S | 13.21 | 13.30 |
| N | 5.77 | 5.57 |
| Cl | 14.61 | 14.39 |

EXAMPLE 18

Synthesis of compound (10):

A mixture comprising 11.0 g of potassium O-ethyl-N-allyl phosphorothioamidate and 7.1 g of ethyl bromide was stirred at 70° to 75°C for 3 hours in 50 ml of ethyl alcohol. The mixture was treated in the same manner as in Example 9 to obtain 9.5 g of O,S-diethyl-N-allyl phosphorothioamidate in the form of a yellow oil, $n_D^{31.5}$ 1.4889.

Elementary analysis:

|   | Calculated (%) (for $C_7H_{16}NO_2PS$) | Found (%) |
|---|---|---|
| P | 14.80 | 14.53 |
| S | 15.32 | 15.58 |
| N | 6.69 | 6.31 |

EXAMPLE 19

Synthesis of compound (11):

A mixture comprising 11.0 g of potassium O-ethyl-N-allyl phosphorothioamidate and 6.8 g of (n)-propyl bromide was stirred under reflux for 3 hours in 50 ml of ethyl alcohol. The mixture was treated in the same manner as in Example 9 to obtain 9.5 g of O-ethyl-S-(n)-propyl-N-allyl phosphorothioamidate in the form of a pale yellow oil, $n_D^{28.5}$ 1.4824.

Elementary analysis:

|   | Calculated (%) (for $C_8H_{18}NO_2PS$) | Found (%) |
|---|---|---|
| P | 13.87 | 13.28 |
| S | 14.36 | 14.51 |
| N | 6.27 | 5.68 |

EXAMPLE 20

Synthesis of compound (12):

A mixture comprising 11.0 g of potassium O-ethyl-N-allyl phosphorothioamidate and 6.5 g of propargyl bromide was stirred at 55° to 60°C for 2 hours in 50 ml of ethyl alcohol. The mixture was treated in the same manner as in Example 9 to obtain 9.8 g of O-ethyl-S-propargyl-N-allyl phosphorothioamidate in the form of a reddish brown oil, $n_D^{32}$ 1.5091.

Elementary analysis:

|   | Calculated (%) (for $C_8H_{14}NO_2PS$) | Found (%) |
|---|---|---|
| P | 14.12 | 13.64 |
| S | 14.62 | 15.16 |
| N | 6.39 | 6.08 |

EXAMPLE 21

Synthesis of compound (13):

A mixture comprising 11.0 g of potassium O-ethyl-N-allyl phosphorothioamidate and 6.5 g of allyl bromide was stirred under reflux for 2 hours in 50 ml of ethyl alcohol. The mixture was treated in the same manner as in Example 9 to obtain 10.0 g of O-ethyl-S-allyl-N-allyl phosphorothioamidate in the form of a yellow oil, $n_D^{28.5}$ 1.4969.

Elementary analysis:

|   | Calculated (%) (for $C_8H_{16}NO_2PS$) | Found (%) |
|---|---|---|
| P | 13.99 | 13.70 |
| S | 14.46 | 14.58 |
| N | 6.33 | 6.10 |

EXAMPLE 22

Synthesis of Compound (14):

A mixture comprising 10.3 g of potassium O-methyl-N-allyl phosphorothioamidate and 4.6 g of 1-chloro-2-butene was stirred and refluxed for 3 hours in 50 ml of methyl alcohol. The reaction liquid was treated in the same manner as in Example 9 to obtain 9.2 g of O-methyl-S-2-butenyl-N-allylphosphorothioamidate in the form of a yellow oil, $n_D^{25.0}$ 1.5079.

Elementary analysis:

|   | Calculated (%) (for $C_8H_{16}NO_2PS$) | Found (%) |
|---|---|---|
| P | 14.00 | 13.87 |
| S | 14.40 | 14.28 |
| N | 6.33 | 6.27 |

EXAMPLE 23

Synthesis of compound (18):

11.2 g of potassium hydroxide was dissolved in 100 ml of methyl alcohol, and the resulting solution was saturated under cooling with hydrogen sulfide to prepare a methyl alcohol solution of potassium hydrosulfide. To this solution was added at room temperature 43.0 g of O,O-dimethyl-N-methylthioethyl phosphorothionoamidate, and the resulting mixture was stirred under reflux for 4 hours. Subsequently, the solvent was removed under reduced pressure, the residue was charged with acetone and freed from insolubles, and then the acetone was removed under reduced pressure. Thereafter, the residue was dissolved in water and then washed with toluene. From the aqueous layer, water was removed under reduced pressure to obtain quantitatively potassium O-methyl-N-methylthioethyl phosphorothioamidate in the form of a wettable pale yellow crystal. 12.0 g of this salt was dissolved in 50 ml of methyl alcohol, and the resulting solution was charged with 6.3 g of propargyl bromide and stirred under reflux for 2 hours. Subsequently, the solvent was removed under reduced pressure, the residue was charged with water and chloroform, and the chloroform layer was dried with anhydrous sodium sulfate. Thereafter, the chloroform was removed under reduced pressure to obtain 9.9 g of O-methyl-S-propargyl-N-methylthioethyl phosphorothioamidate in the form of a reddish brown oil, $n_D^{22.0}$ 1.5457.

Elementary analysis:

|   | Calculated (%) (for $C_7H_{14}NO_2PS_2$) | Found (%) |
|---|---|---|
| P | 12.94 | 12.97 |
| S | 26.79 | 26.31 |
| N | 5.85 | 5.73 |

EXAMPLE 24

Synthesis of compound (17):

To a methyl alcohol solution of potassium hydrosulfide prepared from 100 ml of methyl alcohol, 11.2 g of potassium hydroxide and hydrogen sulfide was added 39.2 g of O,O-dimethyl-N-cyanoethyl phosphorothionoamidate, and the resulting mixture was stirred under reflux for 3 hours. The mixture was treated in the same manner as in Example 23 to obtain quantitatively potassium O-methyl-N-cyanoethyl phosphorothioamidate in the form of a yellow viscous oil.

10.9 g of the thus obtained thiophosphoric acid salt and 6.3 g of propargyl bromide were stirred under reflux for 2 hours in 50 ml of acetone. The reaction mixture was treated in the same manner as in Example 23 to obtain 7.8 g of O-methyl-S-propargyl-N-cyanoethyl phosphorothioamidate in the form of a reddish brown oil, $n_D^{26}$ 1.6188.

Elementary analysis:

| | Calculated (%)<br>(for $C_7H_{11}N_2O_2PS$) | Found (%) |
|---|---|---|
| P | 14.19 | 13.69 |
| S | 14.68 | 14.23 |
| N | 12.84 | 12.51 |

EXAMPLE 25

Synthesis of compound (22):

To a methyl cellosolve solution of potassium hydrosulfide prepared from 100 ml of methyl cellosolve, 11.2 g of potassium hydroxide and hydrogen sulfide was added 42.6 g of O,O-dimethyl-N-methoxypropyl phosphorothionoamidate, and the resulting mixture was stirred at 95° to 100°C for 2 hours. The mixture was treated in the same manner as in Example 23 to obtain quantitatively potassium O-methyl-N-3-methoxypropyl phosphorothioamidate in the form of a pale yellow viscous liquid.

11.9 g of the thus obtained thiophosphoric acid salt and 7.3 g of methyl iodide were stirred at 46° to 50°C for 1 hour in 50 ml of methyl alcohol. Subsequently, the reaction mixture was treated in the same manner as in Example 23 to obtain 8.9 g of O,S-dimethyl-N-methoxypropyl phosphorothioamidate in the form of a colorless transparent oil, $n_D^{25.0}$ 1.4872.

Elementary analysis:

| | Calculated (%)<br>(for $C_6H_{16}N_2O_3PS$) | Found (%) |
|---|---|---|
| P | 14.52 | 14.46 |
| S | 15.03 | 14.87 |
| N | 6.57 | 6.46 |

EXAMPLE 26

Synthesis of compound (19):

A mixture comprising 12.0 g of potassium O-methyl-N-methylthioethyl phosphorothioamidate and 6.5 g of allyl bromide was stirred at 60°C for 4 hours. A separated oily substance was treated in the same manner as in Example 23 to obtain 9.5 g of O-methyl-S-allyl-N-methylthioethyl phosphorothioamidate in the form of a yellow oil, $n_D^{23}$ 1.5305.

Elementary analysis:

| | Calculated (%)<br>(for $C_7H_{16}NO_2PS_2$) | Found (%) |
|---|---|---|
| P | 12.83 | 12.69 |
| S | 26.57 | 26.36 |
| N | 5.81 | 5.75 |

EXAMPLE 27

Synthesis of compound (15):

A mixture comprising 12.7 g of potassium O-methyl-N-ethylthioethyl phosphorothioamidate and 6.3 of propargyl bromide was stirred under reflux for 2 hours in 50 ml of methyl alcohol. Subsequently, the mixture was treated in the same manner as in Example 23 to obtain 10.2 g of O-methyl-S-propargyl-N-ethylthioethyl phosphorothioamidate in the form of a reddish brown oil, $n_D^{26}$ 1.5382.

Elementary analysis:

| | Calculated (%)<br>(for $C_8H_{16}NO_2PS_2$) | Found (%) |
|---|---|---|
| P | 12.23 | 12.11 |
| S | 25.31 | 24.99 |
| N | 5.53 | 5.40 |

EXAMPLE 28

Synthesis of compound (16):

A mixture comprising 11.9 g of potassium O-methyl-N-3-methoxypropyl phosphorothionoamidate and 6.3 g of propargyl bromide was stirred under reflux for 2 hours in 50 ml of methyl alcohol. Subsequently, the mixture was treated in the same manner as in Example 23 to obtain 10.0 g of O-methyl-S-propargyl-N-3-methoxypropyl phosphorothioamidate in the form of a reddish brown oil, $n_D^{23}$ 1.5048.

Elementary analysis:

| | Calculated (%)<br>(for $C_8H_{16}NO_3PS$) | Found (%) |
|---|---|---|
| P | 13.05 | 12.69 |
| S | 13.51 | 13.49 |
| N | 5.90 | 5.64 |

EXAMPLE 29

Synthesis of compound (21):

A mixture comprising 12.0 g of potassium O-ethyl-N-ethylthioethyl phosphorothioamidate and 6.3 g of propargyl bromide was stirred under reflux for 2 hours in 50 ml of ethyl alcohol. Subsequently, the mixture was treated in the same manner as in Example 23 to obtain 11.2 g of O-ethyl-S-propargyl-N-ethylthioethyl phosphorothioamidate in the form of a reddish brown oil, $n_D^{25}$ 1.5351.

Elementary analysis:

| | Calculated (%)<br>(for $C_9H_{18}NO_2PS_2$) | Found (%) |
|---|---|---|
| P | 11.58 | 11.73 |
| S | 23.99 | 23.65 |
| N | 5.24 | 5.08 |

EXAMPLE 30

Synthesis of compound (20):

A mixture comprising 12.0 g of potassium O-methyl-N-methylthioethyl phosphorothioamidate and 6.0 g of ethyl bromide was stirred at 60°C for 3 hours in 50 ml of methyl alcohol. Subsequently, the mixture was treated in the same manner as in Example 23 to obtain 8.5 g of O-methyl-S-ethyl-N-methylthioethyl phosphorothioamidate in the form of a yellow oil, $n_D^{23}$ 1.5197.

Elementary analysis:

|   | Calculated (%) (for $C_6H_{16}NO_2PS_2$) | Found (%) |
|---|---|---|
| P | 13.51 | 13.07 |
| S | 27.96 | 27.63 |
| N | 6.11 | 6.06 |

EXAMPLE 31

Synthesis of compound (24):

A mixture comprising 12.0 g of sodium O-ethyl-N-ethylthioethyl phosphorothioamidate and 10.2 g of 2,3-dibromopropene was stirred under reflux for 2 hours in 50 ml of ethyl alcohol. Subsequently, the mixture was treated in the same manner as in Example 23 to obtain 13.0 g of O-ethyl-S-2-bromopropenyl-N-ethylthioethyl phosphorothioamidate in the form of a yellow oil, $n_D^{24}$ 1.5627.

Elementary analysis:

|   | Calculated (%) (for $C_9H_{19}BrNO_2PS$) | Found (%) |
|---|---|---|
| P | 8.89 | 8.53 |
| S | 18.41 | 18.27 |
| N | 4.02 | 3.71 |

EXAMPLE 32

Synthesis of compound (23):

A mixture comprising 12.0 g of potassium O-methyl-N-methylthioethyl phosphorothioamidate and 5.7 g of 1,3-dichloropropene was stirred under reflux for 3 hours in 50 ml. of methyl alcohol. Subsequently, the mixture was treated in the same manner as in Example 23 to obtain 11.3 g of O-methyl-S-3-chloropropenyl-N-methylthioethyl phosphorothioamidate in the form of a yellow oil, $n_D^{25}$ 1.5528.

Elementary analysis:

|   | Calculated (%) (for $C_7H_{15}ClNO_2PS_2$) | Found (%) |
|---|---|---|
| P | 11.23 | 11.45 |
| S | 23.26 | 23.58 |
| N | 5.08 | 5.31 |

What is claimed is:

1. An amidothiol phosphoric acid ester having the formula,

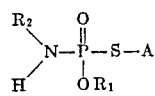

wherein $R_1$ is methyl, ethyl or propyl, $R_2$ is a $C_3-C_{10}$ alkenyl, a $C_2-C_{10}$ alkylthioalkyl, a $C_2-C_{10}$ alkoxyalkyl or a $C_2-C_{10}$ cyanoalkyl, and A is a $C_1-C_3$ alkyl, a $C_3-C_6$ alkenyl, a $C_3-C_6$ alkinyl, a halogen-substituted $C_3-C_6$ alkenyl or a halogen-substituted $C_3-C_6$ alkinyl.

2. An amidothiol phosphoric acid ester of claim 1, wherein $R_1$ is methyl group.

3. An amidothiol phosphoric acid ester of claim 1, wherein $R_2$ is allyl group.

4. A compound of the formula,

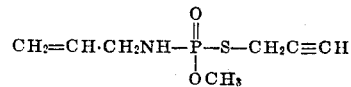

5. A compound of the formula,

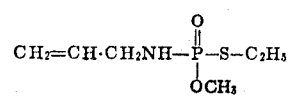

6. A compound of the formula,

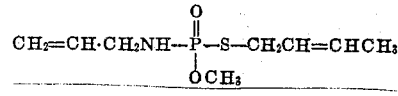

7. A compound of the formula,

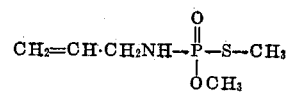

8. A compound of the formula,

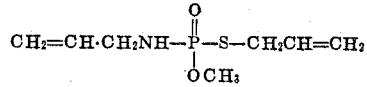

9. A compound of the formula,

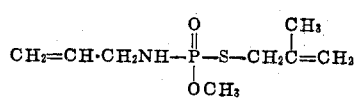

10. A compound of the formula,

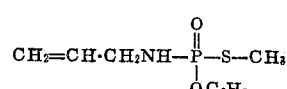

11. A compound of the formula,

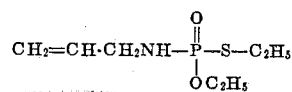

12. A compound of the formula,

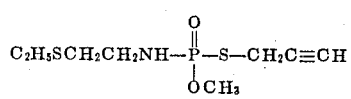

13. A compound of the formula,

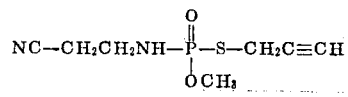

* * * * *